July 15, 1947.  H. I. OSTLUND  2,423,946

HAY STACKER

Filed May 29, 1944  2 Sheets-Sheet 1

Inventor
Henning I. Ostlund
By Williamson & Williamson
Attorneys

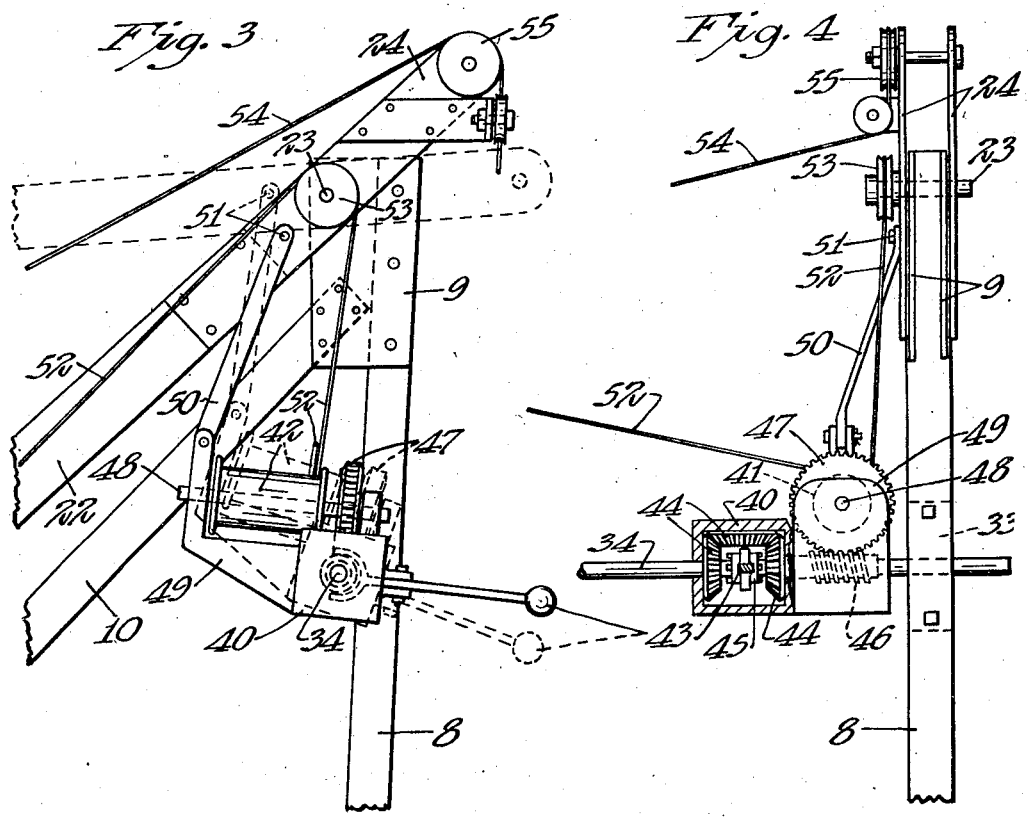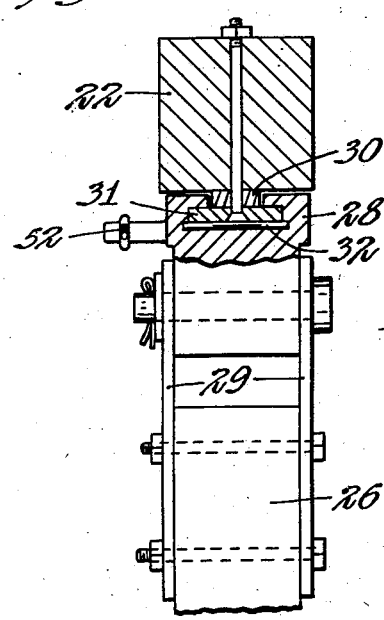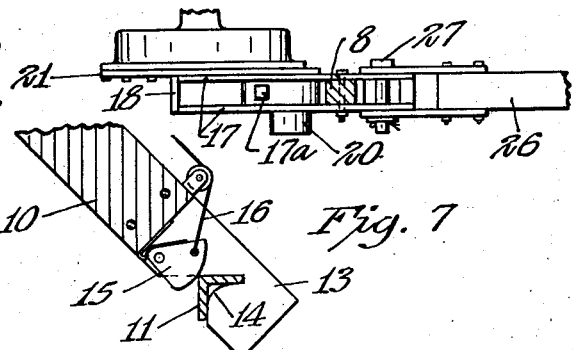

Patented July 15, 1947

2,423,946

UNITED STATES PATENT OFFICE 2,423,946

HAY STACKER

Henning I. Ostlund, Minneapolis, Minn.

Application May 29, 1944, Serial No. 537,800

7 Claims. (Cl. 214—140)

This invention relates to machines of the class known generally as hay stackers which is adapted for use not only as a hay stacker but as a hay rake and a manure loader.

One of the objects of the invention is to provide a stacker frame unit which can be very quickly and easily secured to and removed from a tractor.

Another object of the invention is to provide a stacker including a swinging rake boom wherein the means for elevating and lowering the rake boom are extremely compact so that the frame structure can be maintained close to the ground thus lowering the center of gravity.

Another object of the invention is to provide simple yet effective power connections between the tractor and the movable units of the stacker which is particularly advantageous in combination with my improved stacker frame mounting means.

Still a further object of the invention is to provide cable actuated mechanism for the rake boom operator and for the rake itself wherein the cables are wound on reels and the reels are automatically movable to insure level winding of the cables on the reels.

These and other objects and advantages of the invention will more fully appear from the following description made in connection with the accompanying drawings, wherein like reference characters refer to the same parts throughout the views, and, in which:

Figure 3 is an enlarged fragmentary side view of the upper portion of the frame and rake boom with the boom in elevated position in dotted lines and one of the winding drums shifted correspondingly;

Figure 4 is a fragmentary rear elevation of the structure shown in Figure 3;

Figure 5 is an enlarged fragmentary view showing the rake boom in section and the boom elevating shoe partially in section;

Figure 6 is an enlarged fragmentary view of the rear frame tractor engaging members; and Figure 7 is an enlarged fragmentary view of the front frame tractor engaging members.

Figure 1:
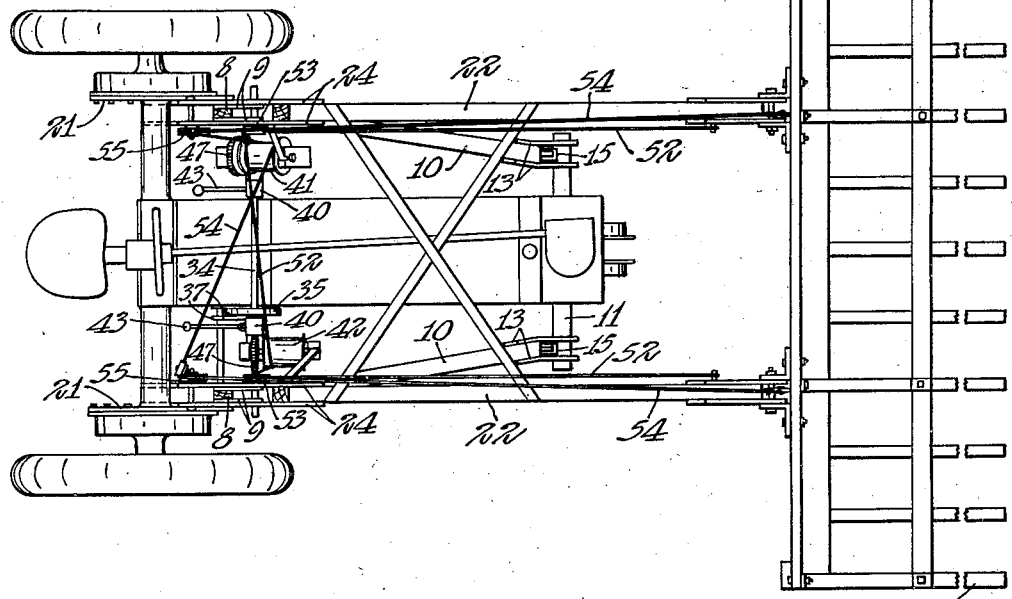
Figure 1 is a plan view of the apparatus on a tractor.

In the drawings there is shown a pair of main vertical frame members 8 having pairs of spaced plates 9 secured to their upper ends. A pair of diagonal brace members 10 extend forwardly and downwardly from the plates 9 to connect with a cross member 11 secured across and beneath the tractor side frame members 12. The lower end of the brace 10 is provided with a pair of spaced plates 13 having notches 14 which are so shaped that the tractor can be driven forwardly beneath the slanting frame members 10, and the angle cross member 11 will ride into the notches 14 whereupon the brace will be locked on the cross member 11 by pivoted cams 15 which drop down behind the cross member 11. Release wires 16 connect to the cams 15 and preferably extend rearwardly adjacent the tractor operator's seat so that the lower ends of the diagonal braces 10 can be released quickly and easily.

The lower ends of the vertical brace members 8 connect with plates 17 which, as best shown in Figure 6, are spaced apart somewhat. The plates are connected at their rear portions by a strap 18, best shown in Figures 2 and 6. As viewed in Figure 2, the rear ends or edges of the plates 17 are cut out to provide rearwardly facing notches 19 and those portions of the plates 17 which define the upper portions of the notches extend rearwardly and upwardly to provide a slanting guide member cooperating with notches 19 so that when the tractor is driven forwardly into the apparatus the plate assembly 17 will rise upwardly on its slanted rear portion and lift the entire stacker frame until the notches 19 receive bosses 20 which are on plates 21 bolted to portions of the rear housing of the tractor.

A pair of rake booms 22 are pivotally connected by means of short shafts 23 to the upper plate assemblies 9 which, as stated above, are secured to the upper ends of the vertical brace members 8. The upper ends of the boom 22 are provided with spaced plates 24 which straddle the spaced plates 9 on the upper end of the brace 8, as best shown in Figure 4. The lower forward ends of the rake booms 22 carry a suitably pivotably connected rake 25 for which can be substituted a manure loading shovel or similar piece of apparatus.

Figure 2:
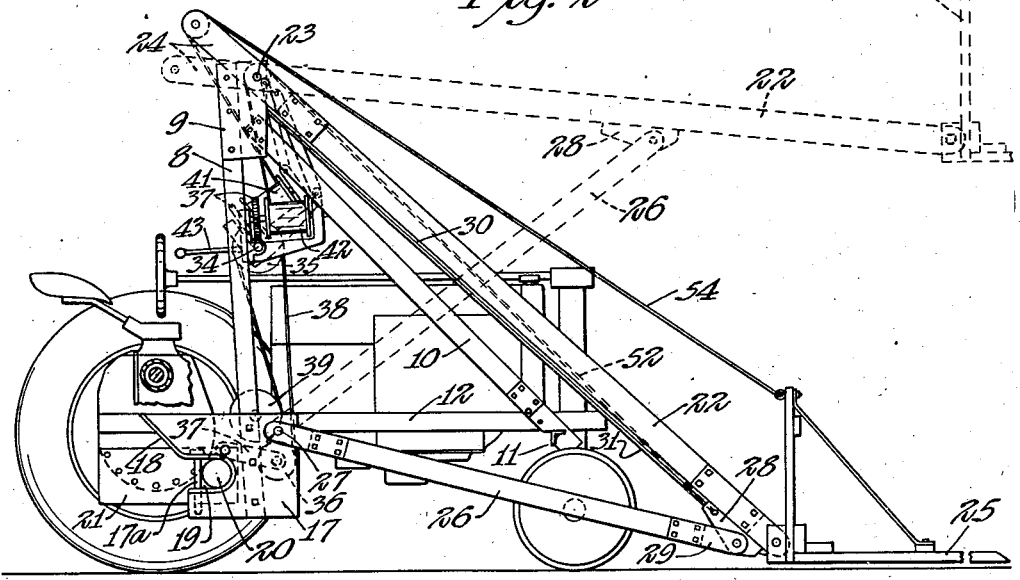
Figure 2 is a side elevational view with the rake boom shown elevated in dotted lines.

Pivotally connected to the lower rear tractor engaging plate assemblies 17 are rake boom actuating members 26. The rear ends of said members have their pivotal connections at 27. The forward ends of the boom actuating members 26 include shoes 28 which are connected to the members 26 by means of spaced plates 29 extending from said members 26 and pivotally connected to the shoes 28, as best shown in Figures 2 and 5. The lower side of the rake boom 22 is provided with a pair of strips of different widths forming a T-shaped track 30 which is adapted to be received in a complementary shaped channel 31 formed in each of the shoes 28. If desired, ball bearings 32 may be provided to produce sliding friction between the shoes 28 and the rake boom 22.

Mounted between bearings 33 on the vertical frame braces 8 is a shaft 34. One end of the shaft carries a pulley 35. Mounted for generally vertically swinging movement relative to the lower anchoring plate assemblies 17 is a second pulley 36 mounted on an arm 37 which in turn is pivotally connected to a rear plate anchoring assembly 17. A belt 38 extends between the pulleys 35 and 36.

The tractor can be driven into the stacker assembly and the braces 10 will connect at their forward ends to the cross piece 11 secured to the tractor and the anchoring plates 17 at the lower rear end of the frame will permit the tractor rear end bosses 20 to ride into mounted position automatically. A locking pin 17a can be dropped into position as shown in Figure 2, thus locking the tractor to the frame. In this position the conventional tractor power pulley 39 will move into engagement with the belt 38 and assume a position relative to pulleys 35 and 36, as best shown in Figure 2. In such a position the tractor power pulley 39 will have tightened the belt to such an extent that the pulley 36 will swing slightly upwardly on its supporting arm 37 and the belt 38 will lie in contact with a considerable portion of the circumference of the pulley 39. This creates a good frictional driving contact.

Shaft 34 which is driven by the belt 38 from the tractor has a pair of hand controlled power transmission members 40 mounted thereon. Each of these is adapted to control the rotation of cable winding drums 41 and 42. As shown in Figure 4, if either of the transmission control handles 43 is shifted it can be made to engage its drum drive for movement in either direction or for no movement in a neutral position. Bevel gears 44 are normally disconnected from the shaft 34. The central clutch collar 45 is splined to the shaft 34 and when it is shifted to connect the shaft to either of the bevel gears 44 there will be a resultant motion in either direction of the worm 46 which is connected to the right hand lateral bevel gear 44. The worm 46 meshes with a worm wheel 47 mounted upon the shaft 48 of the drum 41.

Each of the drums 40 and 41 has its shaft 48 mounted in a bracket 49 which is mounted for pivotal movement about the drive shaft 34. Each of the brackets 49 has a supporting arm 50 which is pivotally connected thereto and which in turn is pivotally connected at 51 to the rake boom 22. Consequently, when the rake boom 22 is swung upwardly it will swing the drums 41 and 42 to alternate positions such as illustrated in Figure 3.

It is clear that cables 52 which extend from the rake boom operating shoes 28 and over pulleys 53 adjacent the upper ends of the rake booms 22 thence to the winding drum 42 will cause the rake boom operating arm 26 and the rake boom 22 to swing upwardly upon winding of the drum 42.

A second set of cables 54 extends from the upper rear portion of the rake 25 over pulleys 55 at the extreme upper ends of the rake booms 22 and thence to the winding drum 41. With the drums 41 and 42 mounted to swing as the rake boom 22 is elevated I provide a level winding arrangement for the sets of cables 52 and 54. As a result the actuation of the device is much more smooth in view of the fact that the coils of the cable lie evenly about their respective drums.

The drum 41 can be actuated at the same time the rake boom 22 is being elevated to keep the rake 25 at a proper material holding level. However, the two drums can be actuated independently of each other depending upon the circumstances.

From the foregoing description it will be seen that I have provided a stacker construction which can be quickly and easily connected to and disconnected from a tractor. It can be mounted upon the tractor by merely running in between the sides of the apparatus and the forward braces 10 will automatically engage the cross member 11 which is secured permanently beneath the tractor frame. At the same time the rear anchoring plate units 17 will receive the bosses 20 at the rear portion of the tractor and said anchoring plate units will ride up on their slanted rear edges and seat the bosses 20 in their sockets 19. The locking pins 17a can then be dropped into place.

At the time the brace 10 and locking plate units 17 are automatically engaging the tractor and lifting the frame relative to the ground the tractor power pulley 29 will engage the belt 38 and the device is ready for operation.

By reason of the sliding shoe 28 on its arm 26 which is used to slide beneath and elevate the rake boom 22 I can construct my stacker frame much lower so that it will handle more easily and provides a simpler construction.

It will, of course, be understood that various changes may be made in the form, details, arrangement and proportions of the various parts without departing from the scope of my invention.

What I claim is:

1. In a hay stacker, a frame, a rake boom pivotally connected to said frame for movement relative thereto, a cable connected to said boom, a drum upon which said cable is adapted to be wound to raise said boom, and a support for said drum shiftable in response to movement of said boom to change the angle of the axis of said drum and maintain a level winding association between said drum and said cable during movement of said boom.

2. In a hay stacker, a frame, a rake boom pivotally connected to said frame, a winding drum on said frame, a pulley carried by said boom adjacent its point of pivotal connection, a cable extending from said drum about said pulley and thence downwardly along said boom to swing the latter upwardly relative to said frame, and a support for said drum shiftable in response to movement of said boom to produce a level winding action of said cable on said drum.

3. In a hay stacker, a frame, a rake boom pivotally secured to said frame for generally vertical movement relative thereto, a rake pivotally mounted on the free end of said boom, a winding drum supported by said frame, a pulley on said boom adjacent its pivotal connection with said frame, a cable adapted to wind upon said drum and extending about said pulley and thence to said rake, and the support for said drum being shiftable in response to movement of said rake boom to maintain said rake cable and drum in a substantially level winding position.

4. In a hay stacker, a frame, an implement movably connected by said frame, and means for attaching said frame to a tractor and the like comprising, a rearwardly open cradle, said cradle including an upper mouth portion having a slanted surface slanting downwardly toward the inner portion of the cradle whereby a portion of a tractor can be moved into engagement with said slanted surface to cause the cradle and frame to be lifted as said portion of the tractor moves further into said cradle.

5. In a hay stacker, a frame, an implement mounted on said frame for movement relative thereto, and a tractor attachment device comprising a member having a socket formed therein with a generally horizontally disposed open mouth portion, and a portion of said member defining the upper portion of said mouth portion being slanted to permit a part of said tractor to be moved into said mouth portion against said slanted portion of said member to support said frame on said tractor in a position out of contact with the ground.

6. In a hay stacker, a frame, an implement boom movably connected at one end to an upper portion of said frame, the other end of said boom being vertically swingable, a boom actuating member having one end movably connected to said frame at a point considerably below the connection between said boom on said frame, said boom having its other end in sliding and supporting engagement with said boom, and power means connected to said boom actuating member for elevating said second mentioned end of said boom actuating member.

7. The structure in claim 6, and a shoe on said actuating member having interlocking connection with said boom and movable longitudinally of said boom.

HENNING I. OSTLUND.

REFERENCES CITED

The following references are of record in the file of this patent:

UNITED STATES PATENTS

| Number | Name | Date |
|---|---|---|
| 2,300,731 | Knarreborg | Nov. 3, 1942 |
| 2,311,523 | Cope et al. | Feb. 16, 1943 |
| 1,710,632 | Main et al. | Apr. 23, 1929 |
| 2,322,472 | Sandvig | June 22, 1943 |
| 203,332 | Fleming et al. | May 7, 1878 |
| 2,371,273 | Walker | Mar. 13, 1945 |
| 2,336,390 | Boll | Dec. 7, 1943 |
| 2,230,755 | Littleton | Feb. 4, 1941 |
| 2,310,284 | Gurries | Feb. 9, 1943 |
| 2,379,523 | Henry | July 3, 1945 |
| 2,395,622 | Galbreath | Feb. 26, 1946 |